April 22, 1952   F. K. MADGWICK ET AL   2,593,585
WEB FEEDING MEANS FOR CUTTING MACHINES
Filed Jan. 11, 1946   5 Sheets-Sheet 1

INVENTOR.
Frederick K. Madgwick
and Joseph A. Silvaggio

W. J. Eccleston,
ATTORNEY

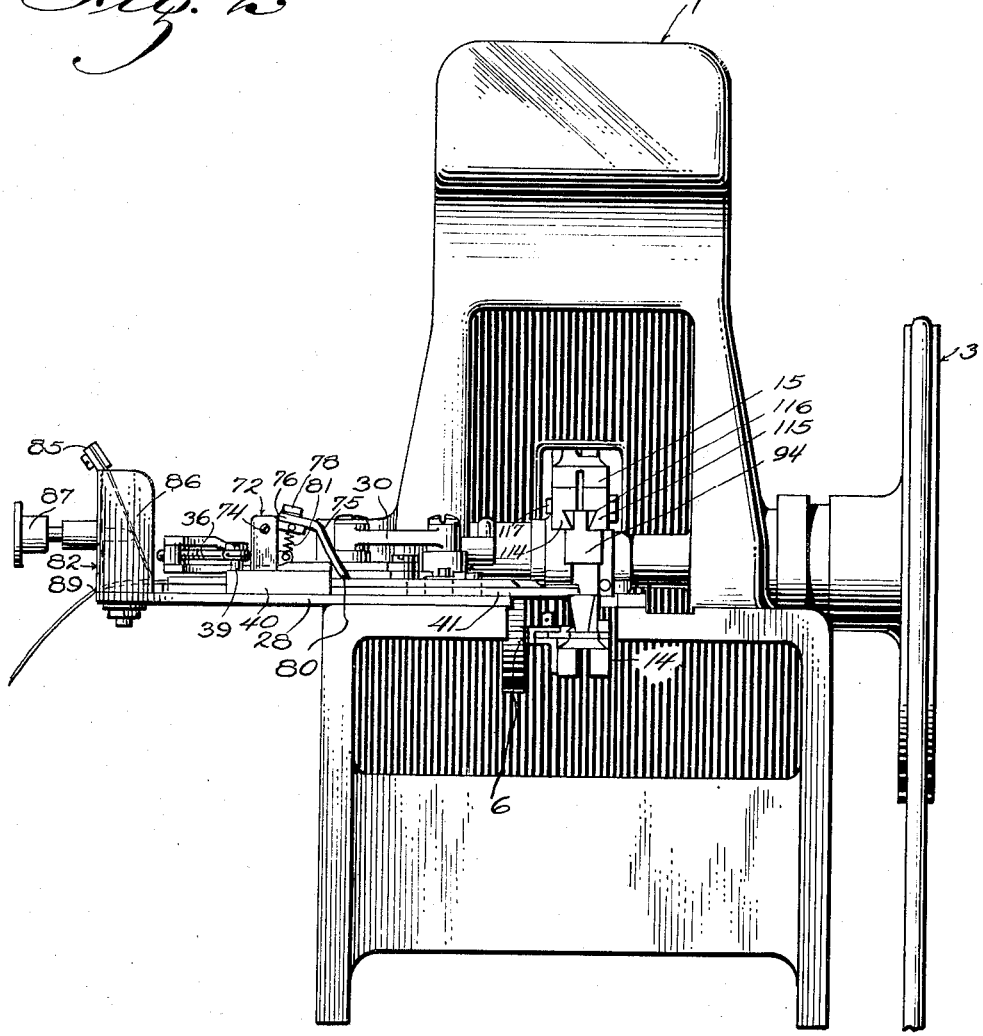

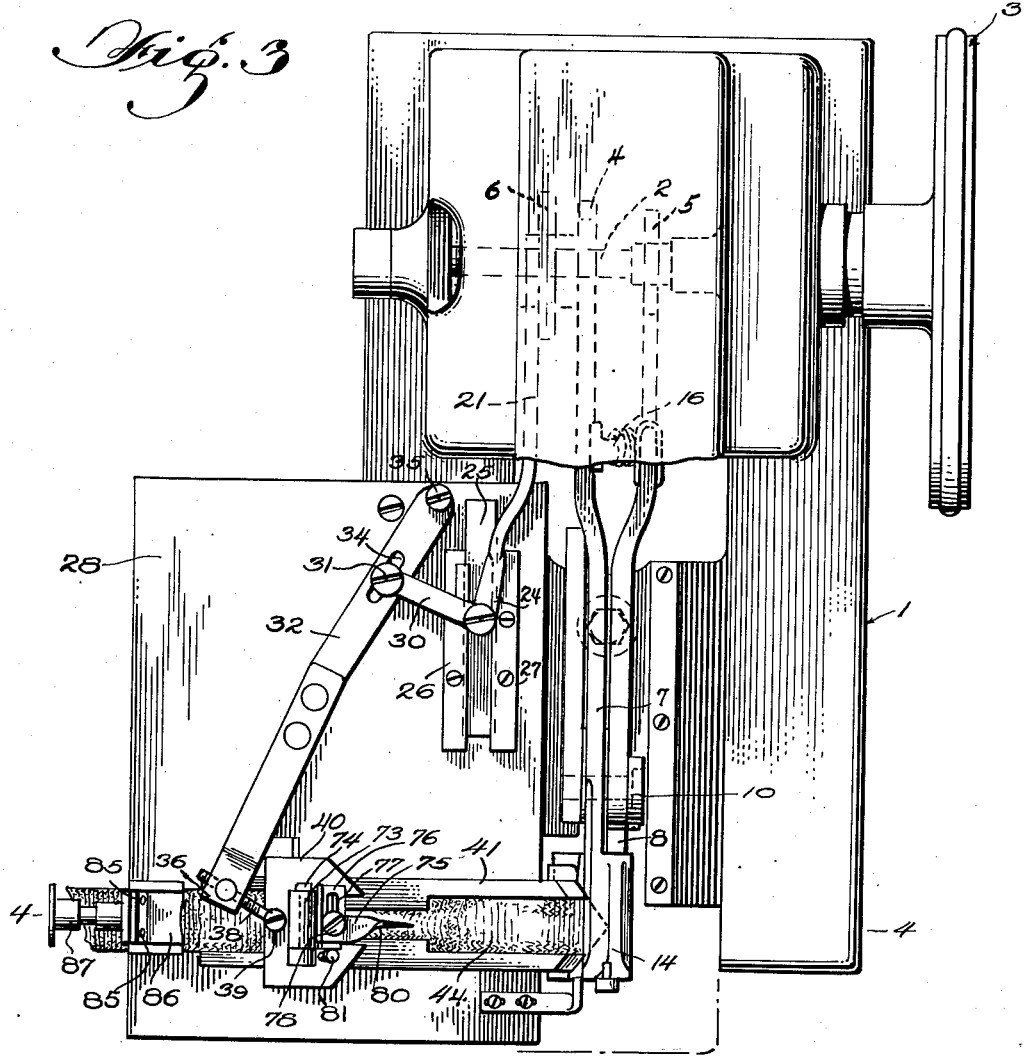
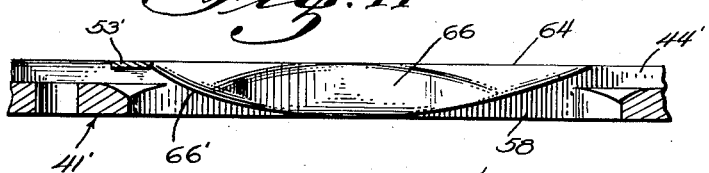

April 22, 1952 F. K. MADGWICK ET AL 2,593,585
WEB FEEDING MEANS FOR CUTTING MACHINES
Filed Jan. 11, 1946 5 Sheets-Sheet 4
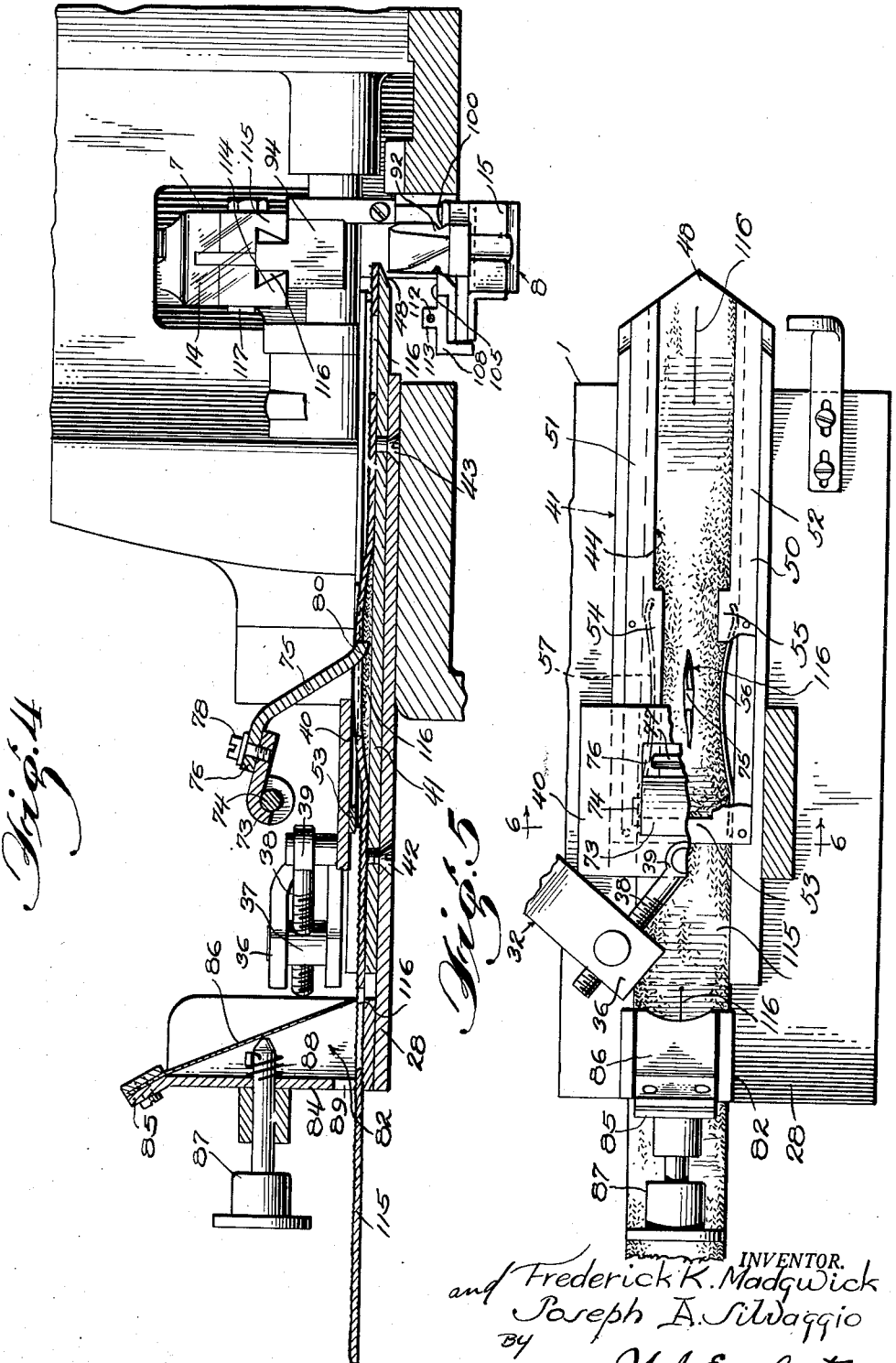
INVENTOR.
Frederick K. Madgwick
and Joseph A. Silvaggio
BY
W. J. Eccleston,
ATTORNEY

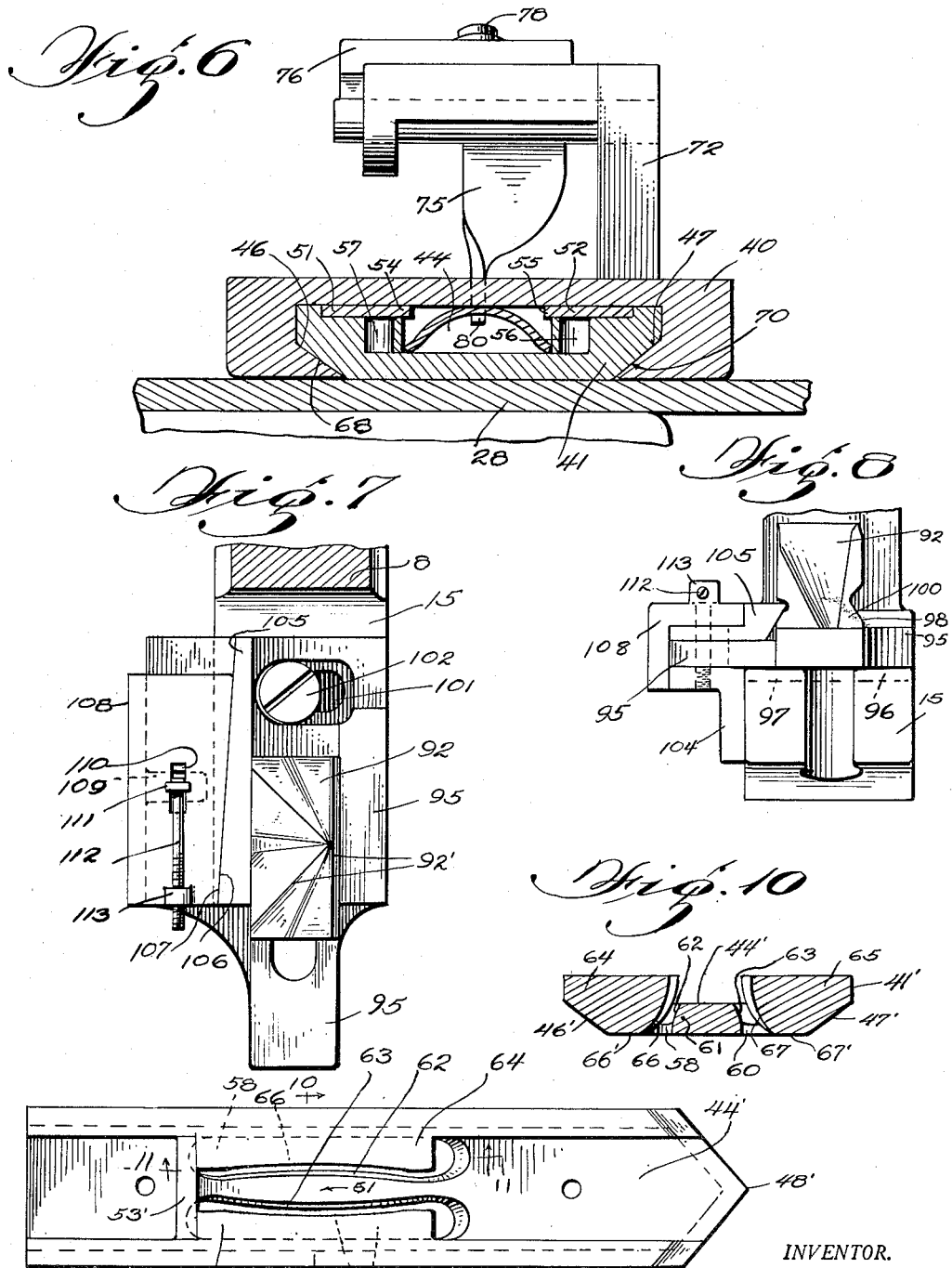

UNITED STATES PATENT OFFICE 2,593,585

WEB FEEDING MEANS FOR CUTTING MACHINES

Frederick K. Madgwick, Upper Darby, and Joseph A. Silvaggio, Philadelphia, Pa.

Application January 11, 1946, Serial No. 640,632

3 Claims. (Cl. 271—2.5)

(Granted under the act of March 3, 1883, as amended April 30, 1928; 370 O. G. 757)

The invention described herein, if patented, may be manufactured and used by or for the Government for governmental purposes, without the payment to us of any royalty thereon.

This invention relates to a machine for cutting web material into predetermined lengths, and more particularly to a machine for cutting such material into tabs of a predetermined size and shape when the same is provided with holes located at predetermined intervals therein.

One object of the invention is to provide a machine of the character described, incorporating means for feeding the material to be operated upon in controlled stages in the direction of the device by which the same is to be cut.

Another object of the invention is to provide means by which a continuous length of fabric or like material can be accurately cut into pieces of predetermined length and shape with a minimum expenditure of time and labor.

A further object of the invention is to provide a means whereby a strip of narrow fabric, such as webbing or the like provided with holes at predetermined intervals, for example, button-holes, may be cut into pieces of desired predetermined length and shape and in which the extremities of all the pieces will be accurately located with respect to the holes therein.

A still further object of the invention is to provide a web cutting machine embodying means whereby a strip of webbing can be cut, with a minimum of cutting movements, into pieces of identical size and shape whose opposite ends are of different shape.

The above and other objects of the invention are accomplished by the provision of the herein described web cutting machine in which fabric or similar material is moved by controlled increments in the direction of a cutting device through the intermediation of a series of adjustable cam-operated levers in coordination with a cam-operated cutting device for severing the material into predetermined lengths. The cutting device is preferably of such a character that one end of one piece of webbing may be cut to a desired shape by the same cutting movement that the adjacent end of the contiguous piece is cut to some other desired shape. Thus by means of the invention a tab of predetermined length, having one end pointed and the other end cut transversely straight across, may be formed by each cutting movement of the machine.

The invention will best be understood from the following description of the preferred embodiment thereof taken with the accompanying drawings wherein:

Figure 2 is a front elevational view of the same;

Figure 3 is a plan view of the same, partly broken away to show working parts of the machine;

Figure 4 is an enlarged front view, partly in section, of the fabric feeding and severing mechanism of the machine;

Figure 5 is an enlarged plan view, partly broken away, of the fabric feeding guide of the machine;

Figure 6 is a sectional view taken along the line 6—6 of Figure 5;

Figure 7 is an enlarged plan view of the fabric cutting knife and the securing and adjusting means therefor;

Figure 8 is an end elevational view of Figure 7;

Figure 9 is a plan view of a modified fabric feeding guide;

Figure 10 is a sectional view taken along line 10—10 of Figure 9; and

Figure 11 is a sectional view taken along line 11—11 of Figure 9.

Figure 1:
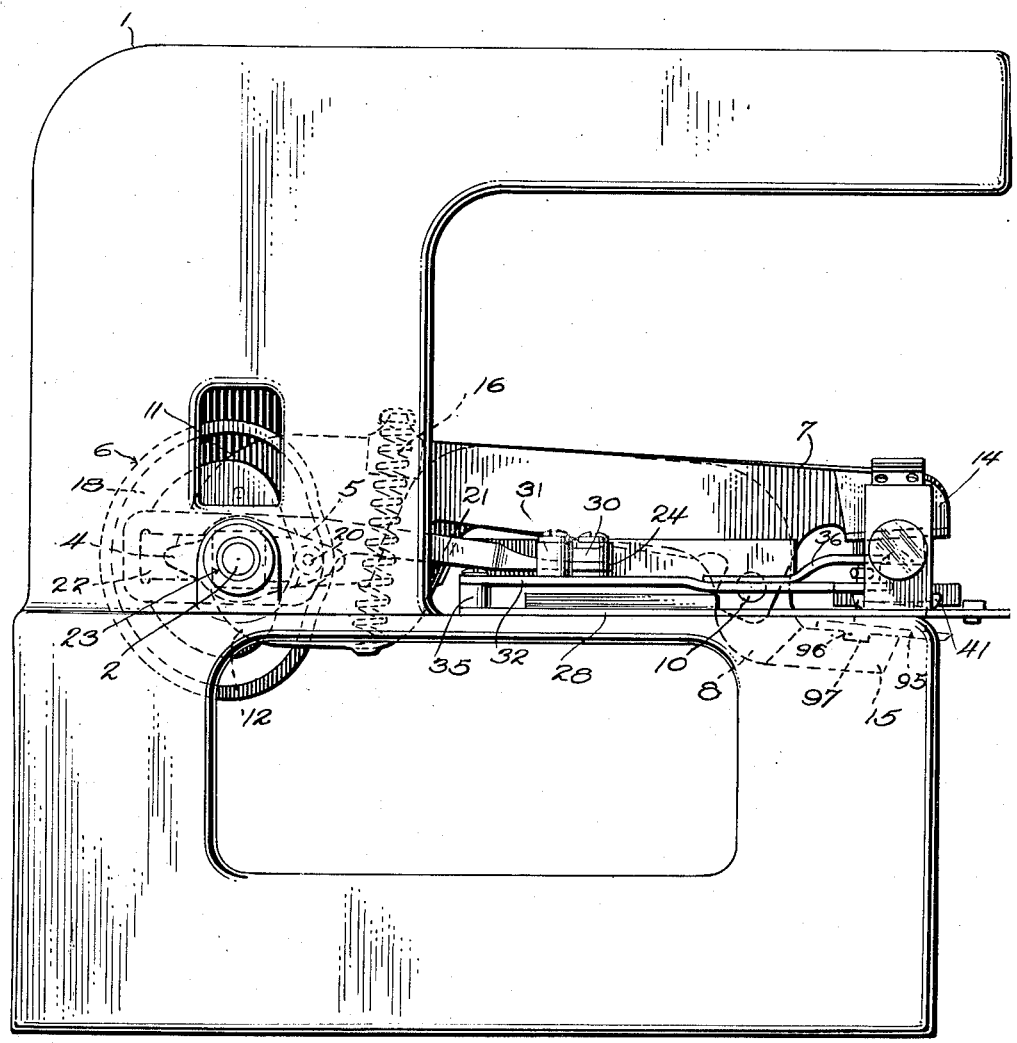
Figure 1 is a side elevational view of the fabric cutting machine.

In the drawings, 1 is a framework of generally U-shape or C-shape as shown, which may be in the form of a casting of suitable size to adequately support the operating parts of the machine and rigid enough to maintain the same against undesirable vibration during operation. 2 is the main driving shaft of the machine which is adapted to be operated by any suitable source of power through the intermediation of any suitable mechanism, such for example, as the driving pulley 3, shown in Figures 2 and 3.

Fixed upon the driving shaft 2 at suitably spaced intervals are the cams 4, 5 and 6, as will best be seen in Figures 1 and 3, which may be secured in any desired manner as by the use of keys and key-ways, and which may be maintained in suitably spaced relation by means of collars on the shaft 2, or by other desired means. The cams 4 and 5 operate the fabric cutting mechanism of the machine and extend in opposite directions from the axis of the shaft 2 as seen in Figure 1. The rear end 11 of the upper cutting lever 7 bears upon the cam 4, and the rear end 12 of the lower cutting lever 8 bears upon the cam 5, the ends 11 and 12 being urged together and into engagement with the cams by a coiled spring 16. It will be apparent from an inspection of the arrangement illustrated in Figure 1, that upon rotation of the shaft 2, the rear ends 11 and 12 of the levers 7 and 8 will be alternately forced apart by the cams 4 and 5, and drawn together by the coil spring 16, thus causing the front ends 14 and 15 of the levers to be moved toward and away from each other.

The cam 6, which operates the fabric feeding mechanism of the machine, has a lateral groove 18 therein, forming a cam-track in which a roller 20 is adapted to move. The roller 20 is rotatably supported upon the feed driving lever 21, which is provided at one end with a widened portion having a rectangular opening 22 to accommodate a collar 23 which fits on the shaft 2. As can be seen in Figure 1, the rotation of the cam 6 causes the roller 20 to follow the lateral groove 18 therein whereby the feed driving lever 21 is caused to reciprocate back and forth.

The feed driving lever 21, at the end 24 thereof remote from the cam 6, is secured to a slide block 25 moving between guides 26 and 27 rigidly secured to a supporting plate 28 fastened to the frame of the machine. A connecting link 30 has one end pivoted upon the slide block 25 and the other end pivoted at 31 to a feed lever or rocker arm 32 through a slotted hole 34 in the latter, whereby the position of the pivot 31 can be adjusted. The feed lever 32 is pivoted at the end 35 to the frame of the machine, and at the opposite end is provided with a forked portion 36, to which is pivoted an apertured swivel block 37, shown in Figure 4. An eyed hinge screw 38 is threaded into the apertured swivel block 37 and is pivoted through its eye 39 to a feed carrier 40. The feed carrier 40 is slidably secured to a feed track 41 which is in turn secured upon the plate 28 by screws 42 and 43.

The manner in which reciprocatory motion is imparted to the feed carrier 40 can best be seen in Figures 1 and 3. In Figure 3 it will be seen that the feed driving lever 21 is given a reciprocating motion by the cam 6 when the shaft 2 is rotated. The lever 21 in turn moves the slide block 25 as seen in Figure 3, and therewith the link 30. The movement of the link 30 causes a pivotal movement of the feed lever 32 about the pivoted end 35 giving an arcuate motion to the forked end 36 thereof. The swivel block 37 and hinge screw 38 transmit the arcuate motion of the fork 36 to the feed carrier 40 moving the same back and forth along the fabric feeding guide 41.

In its preferred form the fabric feeding guide 41, as best seen in Figures 4, 5 and 6, is a flat plate provided with shallow channel 44 extending from end to end in its upper surface. The guide 41 is secured upon the plate 28 by means of screws 42 and 43. The guide 41 has beveled edges 46 and 47 along its lower surface, seen in Figure 6, and is provided with a pointed forward end 48. A thin plate 50, generally of U-shape, is set flush with the upper surface of the guide 41, the legs 51 and 52 of the U being widened along part of their length to project inwardly as at 54 and 55 slightly over the channel 44, and the bottom 53 of the U bridging the channel 44. The projecting portions 54 and 55 of the legs of the plate 50 are thus widened near the bottom of the U, as seen in Figure 5, and beneath these widened portions narrow flexible leaf springs 56 and 57 are arranged longitudinally in the channel 44 and bowed laterally inwardly thereof. These leaf springs are for the purpose of laterally compressing a fabric strip passing through the feed guide 41 and causing the same to be bowed or arched upwardly to spread open buttonholes located at spaced intervals along the strip, as will later be explained. As shown in Figures 4 and 6, the web of material will be arched both in a transverse and longitudinal direction.

A modified form of fabric feeding guide is shown in Figures 9 and 10 wherein the guide is indicated as $41^1$. The guide $41^1$ has the shallow channel $44^1$ in its upper surface, the beveled edges $46^1$ and $47^1$, and the pointed forward end $48^1$, corresponding to similar parts of the preferred form of guide just described. A thin bridge $53^1$ extends across the channel $44^1$ near the rear end of the guide $41^1$. Midway of its length the bottom of the guide $41^1$ has two longitudinal openings 58 and 60 in its bottom. The openings 58 and 60 are of such size and configuration as to leave an elongated portion 61 of the bottom of the feed guide between them, providing upwardly and inwardly sloping cam-like surfaces 62 and 63 on each side of the portion 61. Opposite the surfaces 62 and 63 the sides of the channel $44^1$ extend inwardly to form two portions 64 and 65 having the inner sloping cam-like surfaces 66 and 67, and the bottom cam-like surfaces $66^1$ and $67^1$. The surfaces 66 and 67 are concaved inwardly in a horizontal direction, as best shown in Figure 9, and slope inwardly and upwardly, as best shown in Figure 10. The bottom cam surfaces $66^1$ and $67^1$ best shown in Figures 10 and 11, are convexed downwardly. A fabric strip passing under bridge $53^1$ has its side edges cammed downwardly by the cam surfaces $66^1$ and $67^1$ and inwardly by the cam surfaces 66 and 67, thus forming a transverse arch in the fabric to cause spreading open of the buttonholes in the strip in a manner similar to that described in connection with the fabric feeding guide 41. During the arching of the strip, the side edges of the strip enter the longitudinal openings 58 and 60 and are guided thereby. The fabric feed guide $41^1$ is secured to the plate 28 in the same manner as has already been described for the preferred form of guide 41.

The feed carrier 40 has its bottom formed with a downwardly opening channel having the inwardly facing sloping surfaces 68 and 70 for engagement with the beveled surfaces 46 and 47 of the preferred form of guide 41, or with the corresponding surfaces $46^1$ and $47^1$ of the modified form of guide $41^1$. The feed carrier is thus made interchangeable with either form of the feed guide. The feed carrier 40 is provided with an upwardly extending post 72 to which is attached a hinge 73 by means of the screw 74. A feed pawl 75, shown in Figures 2, 3, 4 and 6, has a horizontal portion 76, provided with an elongated opening 77, by which the pawl 75 is attached to the hinge 73 by a screw 78. By loosening the screw 78, the pawl 75 can be shifted laterally to adjust its position with relation to the feed carrier 40. The feed pawl is pointed at its free end 80 and the point is urged in a downward direction by a coil spring 81.

Adjacent the rear end of the fabric feeding guide 41 a bracket 82 is secured to the plate 28, which bracket has an upwardly extending portion 84 bent outwardly at a slight angle at its upper end 85. A strip of thin flat spring metal 86 is secured by one end to the portion 85 of the bracket and extends downwardly therefrom at an angle. A release plunger 87 passes through the bracket 82 and bears at its inner end on the metal strip 86 to enable raising of the lower end of the metal strip for inserting or removing the webbing. A coil spring 88, or similar means, is provided on the plunger 87 to maintain the same against the spring 86. The spring 86 urges plunger 87 outwardly. An opening 89 is formed in the bracket 82 near its bottom through which a strip of fabric may be passed. The metal strip 86 bears upon the upper surface of the fabric strip while the same is passing through the opening 89 and through the feed guide 41 toward the cutting mechanism of the machine, and acts as a check spring to prevent any tendency of the fabric to move backward through opening 89. Spring 86 in conjunction with pawl 75 gives tension to the webbing prior to cutting. The spring 86 also prevents forward overthrow of the webbing under action of pawl 75.

The cutting mechanism of the machine comprises the levers 7 and 8 operated by the cams 4 and 5, respectively, as previously described. A fabric cutting knife 92 which may conveniently have cutting edges 92¹ in the form of a K, is carried by the front end 15 of the lower cutting lever 8, and an anvil 94 opposed to the knife 92, is carried by the front end 14 of the upper cutting lever 7. The manner in which the fabric cutting knife 92 is secured to the end 15 is illustrated in Figures 7 and 8 of the drawings. A clamping member 95 has a downwardly extending portion 96 fitting into a transverse groove 97 in the end 15 of the lower cutting lever 8, as seen in Figures 1 and 8. The clamping member 95 has an upwardly extending portion formed with an undercut sloping surface 98 for engaging a dove-tailed portion 100 of the knife 92. The clamping member 95 has an elongated opening 101, through which it is adapted to be adjusted laterally of the end 15 by loosening the screw 102. An angle bracket 104 is fastened to the end 15 by screws or other means and is associated with a clamping member 105 opposed to and also overlying a portion of the clamping member 95. The clamping member 105 has a wedging surface 106 which is adapted for engagement with a similar wedging surface 107 of a wedge member 108. The wedge member 108 overlies a portion of the clamping member 105. The wedge member 108 has an elongated opening 110 therein through which an upstanding post 111 fixed on the bracket 104 extends. A screw 112 extends through a hole in the post 111 and the opposite end of the screw is threaded in a lug 113 formed on the wedge member 108. The dove-tailed portion 100 of the knife 92 is adapted to be securely clamped between the clamping members 95 and 105. As will be seen by an inspection of Figure 7, by loosening the screw 102 and adjusting the position of the wedge member 108 by turning the screw 112, the clamping members 95 and 105 can be moved to any desired position on the end 15 of the lower cutting lever 8, and upon retightening the screw 102 the knife will be held and securely clamped in place. The clamping members 95 and 105 have cut-out portions, indicated by dotted line in Figure 7, for allowing movement of the same without interference with the post 111 on the bracket 104. The anvil 94 is secured to the end 14 of the cutting lever 7 by means of the opposed clamping portions 114 and 115 between which the dove-tailed portion 116 of anvil 94 is held by the screw 117, as best seen in Figures 2 and 4.

Before setting the above described fabric cutting machine into motion, a strip of fabric 115, such for example as a strip of webbing, having the button-holes 116 therein at spaced intervals, is inserted by one end through the opening 89 in bracket 82, beneath the cross member 53, and pressed down into the channel 44 of the feed guide 41. By reason of the leaf springs 56 and 57 pressing against the side edges of the strip 115, the same will be arched upwardly between the springs and a button-hole located therebetween will be spread open, as is plainly shown in Figure 5. The feed pawl 75 is raised against the tension of spring 81 and the strip 115 is adjusted so that the pointed end 80 of the pawl will fall within a buttonhole spread open as just described.

The machine is then in condition for operation and upon starting rotation of the shaft 2, the feed lever driving cam 6 will operate the feed driving lever 21 which in turn operates the link 30, the feed lever 32, and hinge screw 38, thus causing the feed carrier 40 to move back and forth along the feed guide 41 under a toggle linkage. When the feed carrier 40 moves forward, the point 80 of feed pawl 75 engages the forward end of buttonhole 116 and moves the fabric strip 115 toward the cutting mechanism. While the fabric feeding mechanism is operating as just described, the cams 4 and 5 will be moving the cutting levers 7 and 8, and it will readily be appreciated that the cams 4, 5 and 6 may be adjusted so that the knife 92 will meet the anvil 94 and sever the fabric strip 115 just as or shortly after the feed carrier 40 reaches its forwardmost position, or the cutting mechanism can be adjusted to sever the strip at any desired point in the movement of the feed carrier.

After the completion of a single cutting movement of the machine, the feed carrier starts its backward movement, and the point 80 of pawl 75 rides out of the buttonhole. The back of the point 80 is rounded to facilitate backward movement without pulling the webbing. When the carrier 40 reaches its rearmost position, the point 80 of pawl 75 will fall into the next buttonhole ready to move forward another length of the fabric strip. Preferably point 80 has a slight over-movement in a backward direction, that is, a movement greater than the spacing of buttonholes to insure the point 80 dropping into the buttonhole even though the distance between buttonholes may vary somewhat due to handling and stretching of the web material. After point 80 drops into a buttonhole, the forward stroke commences and point 80 moves forwardly until it engages the material at the forward end of the buttonhole to carry the material forward to repeat the cycle.

It will readily be seen that by changing the position of the pivot 31 in the opening 34 in the feed lever 32 the distance traveled by the carrier 40 can be adjusted as desired, and that very small adjustments in this distance can be made by turning the hinge screw 38. Pieces of fabric of any desired length, with buttonholes in any desired location therein, can thus be very rapidly cut from a long continuous strip of material. For example, tabs of fabric can be cut with a buttonhole a uniform distance from the tip or forward end of each tab.

By providing the knife 92 with several cutting edges, such for example as the K-shaped arrangement described, the front end of one piece of fabric can be cut to one shape, for example, a V-cut, while the rear end of the preceding piece can be given some other shape, for example, a straight cut. Two cutting operations are thus accomplished at a single stroke. Since the material cut out between contiguous strips is wasted, the several cutting edges should be as close to each other as possible, preferably merging at at least one point.

The adjustment screw 78 permits lateral adjustment of the feed pawl 75 to insure centering of the feed pawl when the buttonholes are in the center line of the fabric strip. If it is desired to cut a strip of fabric having buttonholes in some location other than on the longitudinal axis of the material, the feed pawl 75 can be readily adjusted to operate upon any such material by loosening the screw 78 and moving the point 80 laterally into engagement with a buttonhole in the fabric, while the same is in position in the feed guide.

Should there be any tendency for the fabric to move backward in the machine, due to the return of the point 80, or from any other cause, such movement will be prevented by the checking action of the metal strip 86 thereon. The metal strip 86 bearing against the fabric also produces a uniform sound when the machine is operating perfectly, any undesirable change in the conditions of operation, such as sticking of the fabric in the feeding mechanism, or the end of the fabric being reached, resulting in a change in the sound or cessation thereof, and thus acting as a signal.

It will thus be seen that the invention provides a simple and effective means, very flexible in operation and capable of use with a wide variety of fabrics or other web material having holes to accurately produce pieces of uniform size and configuration with the holes arranged in any desired relation.

It will of course be understood that many changes in the form and arrangements of the parts of the machine can be made, and many obvious mechanical equivalents can be substituted for the parts shown and described herein, all of which would fall within the scope of the appended claims and involve no departure from the spirit of the invention.

We claim:

1. Means for feeding a continuous web of material provided with a series of longitudinal slits to an operational means in synchronization therewith, said feeding means including a guide having a flat bottom and longitudinally extending portions at the sides thereof and spaced from the flat bottom forming a partly inclosed channel for said web, means associated with the channel for engaging the side edges of the web and restricting the width of the channel and pressing the side edges toward each other to form an upwardly-extending transverse arch in the web and thereby separating the edges of the slit in the material in the channel, and reciprocating finger means extending between the longitudinally extending portions of the channel for engaging the wall of a slit in the region of the arch.

2. Means for feeding a continuous web of material provided with a series of longitudinal slits to an operational means in synchronization therewith, said feeding means including a guide having a guide having a flat bottom and longitudinally extending portions at the sides thereof and spaced from the flat bottom forming a partly inclosed channel for said web, cam means associated with the channel for engaging the side edges of the web and restricting the width of the channel and pressing the side edges toward each other to form an upwardly-extending transverse arch in the web and thereby separating the edges of the slit in the material in the channel, and reciprocating finger means extending between the longitudinally extending portions of the channel for engaging the wall of a slit in the region of the arch.

3. Means for feeding a continuous web of material provided with a series of longitudinal slits to an operational means in synchronization therewith, said feeding means including a guide having a flat bottom and longitudinally extending portions at the sides thereof and spaced from the flat bottom forming a partly inclosed channel for said web, elongated leaf springs associated with the channel for engaging the side edges of the web and restricting the width of the channel and pressing the side edges toward each other to form an upwardly-extending transverse arch in the web and thereby separating the edges of the slit in the material in the channel, and reciprocating finger means extending between the longitudinally extending portions of the channel for engaging the wall of a slit in the region of the arch.

FREDERICK K. MADGWICK.
JOSEPH A. SILVAGGIO.

REFERENCES CITED

The following references are of record in the file of this patent:

UNITED STATES PATENTS

| Number | Name | Date |
|---|---|---|
| 565,186 | Taylor | Aug. 4, 1896 |
| 848,187 | Meyers | Mar. 26, 1907 |
| 1,054,976 | McCauley | Mar. 4, 1913 |
| 1,243,673 | Chatfield | Oct. 16, 1917 |
| 1,340,882 | Freeman | May 25, 1920 |
| 1,394,422 | Maranville et al. | Oct. 18, 1921 |
| 1,481,332 | Stock | Jan. 22, 1924 |
| 1,510,696 | Naugle | Oct. 7, 1924 |
| 1,852,379 | Ruau | Apr. 5, 1932 |
| 1,986,678 | Laencher | Jan. 1, 1935 |
| 2,073,507 | Weimont | Mar. 9, 1937 |
| 2,155,762 | Von Kintzel | Apr. 25, 1939 |
| 2,158,790 | Arthur | May 16, 1939 |
| 2,205,573 | Medwick et al. | June 25, 1940 |
| 2,382,406 | Engberg | Aug. 14, 1945 |
| 2,465,304 | Wyrick | Mar. 22, 1949 |